Nov. 10, 1936.  E. R. EVANS  2,060,667
POWER DISTRIBUTION SYSTEM
Original Filed July 3, 1931
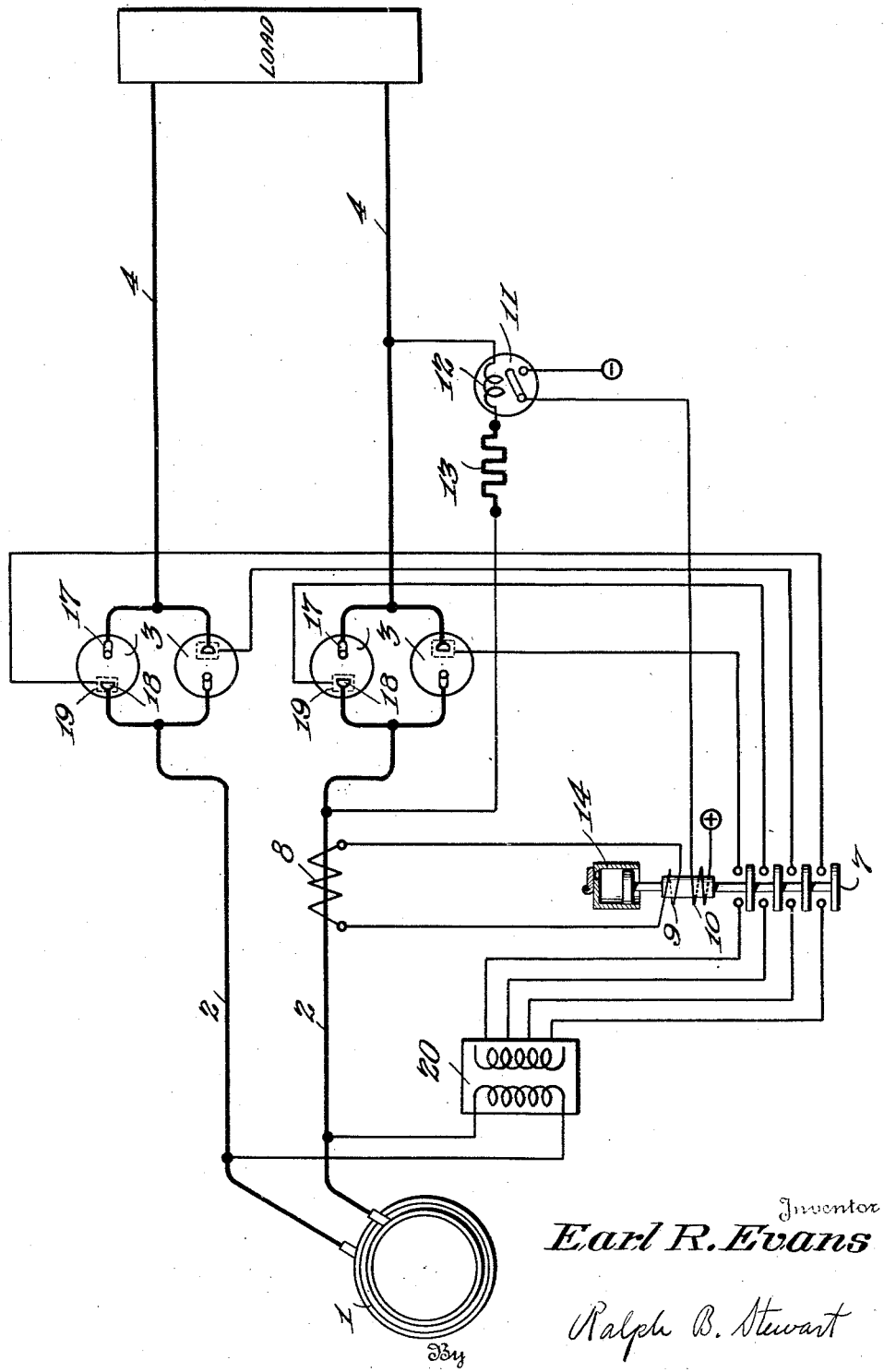
Inventor
Earl R. Evans
Ralph B. Stewart
Attorney Patented Nov. 10, 1936

2,060,667

UNITED STATES PATENT OFFICE 2,060,667

POWER DISTRIBUTION SYSTEM

Earl R. Evans, Washington, D. C., assignor to General Electric Company, a corporation of New York Application July 3, 1931, Serial No. 548,676
Renewed May 11, 1935

7 Claims. (Cl. 175—294)

The present invention relates to electrical systems and more particularly to power distribution systems embodying space-discharge devices.

One object of the invention is to provide a system embodying two circuits and improved means including a space-discharge device for connecting said circuits together under predetermined conditions.

Another object of the invention is to provide a system embodying a generator or supply circuit, a feeder or load circuit and means including a space-discharge device for interconnecting the same, said means being responsive to the resistance or other electrical condition of said feeder or load circuit.

In accordance with one embodiment of the invention, means including a space-discharge device is arranged to disconnect a feeder or limit the flow of current therein upon the occurrence of a short-circuit upon the feeder and re-connect or re-energize the feeder when the resistance thereof rises to a predetermined value; for example, to a value indicating the removal or absence of the short-circuit. The space-discharge device employed in carrying out the invention is preferably an arc-discharge device of large current-carrying capacity and low impedance. A suitable discharge device is the power-arc tube disclosed in Langmuir Patent #1,289,823, dated December 31, 1918 but the invention is not limited to this particular device as will be apparent. As the construction and characteristics of the Langmuir tube are set forth in detail in said patent, this type of tube will be referred to for the purposes of illustration in the following description of a system embodying the invention.

For a better understanding of the invention, reference should be had to the accompanying drawing, the single figure of which is a diagrammatic view of a system embodying the invention.

Referring to the drawing, a power distribution system is shown comprising an alternating-current generator 1, a supply circuit 2 and space-discharge devices 3 between said supply circuit and the feeder or load circuit 4. A plurality of feeders may be connected to the supply circuit 2, as is usual in power distribution systems of the character indicated, and in such cases, space-discharge devices 3 are provided in connection with each feeder which it is desired to protect or control as hereinafter described.

The space-discharge devices may be of the Langmuir type described in the above-mentioned patent or any other type having large current-carrying capacity, low internal voltage drop and controllable as to impedance. In the Langmuir tube, when an alternating potential is applied to the anode and cathode, an arc is formed during each half-cycle when the cathode is negative with respect to the anode provided the control electrode is at a suitable potential. The arc path becomes de-ionized rapidly at the end of each of said half-cycles, and the re-striking of the arc and thus the average current through the tube is controlled by the magnitude and/or the phase relation of the control-electrode potential. The constructional details of said tube are set forth in said patent, as stated above.

In the specific embodiment of the invention shown in the drawing merely for purposes of illustration, negative potentials are applied to the control electrodes of the space-discharge devices 3 through the contacts of a relay 7 when it is desired to limit or prevent the flow of current through the devices. It will be understood that if the potential of each of the respective control electrodes is negative with respect to the associated cathode, at least while there is a tendency for an arc to form because of the positive potential of the anode with respect to the cathode, the arc will be retarded or completely prevented from striking depending upon the magnitude of the control-electrode potential. This principle is utilized to control the energization of the feeder 4 in an obvious manner.

The relay 7 is energized by a current transformer 8 in the supply circuit 2, said transformer being connected to a winding 9 of the relay. A second winding 10 serves as a locking winding adapted to be controlled by the contacts of a resistance-measuring relay 11 having a winding 12 connected in shunt relation to the space-discharge devices 3. A resistor 13 may be provided in series with the relay 12 as indicated. The relay 7 is provided with a dashpot 14 or other suitable means whereby the contacts thereof are quick to close and slow to release.

In normal operation, the feeder or load circuit 4 is energized through the space-discharge devices 3. Upon the occurrence of a short-circuit on said feeder, however, the relay 7 becomes energized and applies suitable potentials to the space-discharge devices 3 whereby the flow of current to the feeder is preferably completely interrupted. As the impedances of the devices 3 increase, the relay 11 becomes sufficiently energized to maintain the relay 7 closed through the instrumentality of the contacts of relay 11 and the winding 10. When, however, the short-circuit disappears from the feeder 4, the relay 11 which, being in series therewith, is responsive to the resistance of the short-circuit becomes de-energized. Then the relay 7 opens its contacts and current is re-established to the feeder 4 through the space-discharge devices 3. It will thus be seen that the energization of the feeder 4 is controlled in a simple and effective manner in accordance with the resistance thereof, being de-energized upon the occurrence of a short-circuit and re-energized only after the resistance of the feeder has increased, for example, to such an extent as to indicate the removal of the short-circuit.

In the embodiment of the invention shown, a pair of discharge devices 3 is provided for each conductor of the circuit in order to pass both half-waves of the current. Each space-discharge device includes a cathode 17, an anode 18 and a screen or control electrode 19, the latter being separately connected to individual contacts of relay 7. The potentials for controlling the space-discharge devices through the instrumentality of the control electrodes thereof may be derived from a transformer or suitable network 20 energized from the supply circuit 2. Where an alternating control potential is employed, it should be understood that the phase relation thereof should be properly coordinated with the current traversing the space-discharge devices as pointed out in the above-mentioned Langmuir patent.

The system shown and described herein is merely illustrative of the invention and various modifications thereof will occur to those skilled in the art and should be considered within the scope of the invention as defined by the appended claims.

I claim:

1. An electrical system comprising a supply circuit, a feeder circuit, means including an arc-discharge device of controllable impedance for interconnecting said circuits, said device being interposed between said circuits, an over-current relay arranged to increase the impedance of said arc-discharge device upon the occurrence of an overload in the feeder circuit to limit the flow of current, a second relay energized in accordance with the resistance of the feeder circuit and means including said second relay for subsequently decreasing the impedance of said arc-discharge device to re-energize the feeder circuit in response to a predetermined increase in the resistance thereof.

2. An electrical system comprising a supply circuit, a load circuit, an arc-discharge device interposed between said circuits, means for rendering said device non-conductive to de-energize the load circuit, means for supplying load-measuring current to the load circuit when said arc-discharge device is non-conductive and means for rendering said arc-discharge device conductive in response to a predetermined decrease in said load-measuring current.

3. An electrical system comprising a load circuit, means including an arc-discharge device in series relation with the load circuit for controlling the supply of current to said circuit, means for rendering said device non-conductive, a circuit in shunt relation to said discharge device for supplying a load-measuring current to said load circuit when said discharge device is non-conductive and means including a relay in said shunt circuit for rendering said discharge device conductive in response to a predetermined change in the load on said load circuit.

4. An electrical system comprising a supply circuit, a load circuit, an arc-discharge device in series relation between said circuits to be traversed by the current applied to said load circuit and means including a load-measuring device in series relation with said load circuit and in parallel with the arc-discharge device for rendering said arc-discharge device non-conductive when the current supplied to the load circuit tends to become excessive and for thereafter reducing the impedance of said arc-discharge device to supply current to the load circuit after conditions become normal.

5. An electrical system comprising a supply circuit, a space-discharge device of the power-arc type connected thereto, a load circuit connected to said supply circuit through said space-discharge device, a shunt circuit in parallel relation to said space-discharge device and connecting said supply and load circuits, and means including an electro-responsive device connected to said load circuit for controlling said space-discharge device to render the same non-conductive in response to an abnormal electrical condition of said load circuit and conductive again when said condition returns to normal.

6. An electrical system comprising a supply circuit, a load circuit, an arc-discharge device in series relation between said circuits to be traversed by the current supplied to said load circuit, a shunt circuit in parallel relation to said arc-discharge device and connecting said supply and load circuits, means for rendering said arc-discharge device non-conductive, and means connected to said shunt circuit for controlling the conductivity of said arc-discharge device to re-connect said supply and load circuits therethrough.

7. In a system of distribution, an alternating current supply circuit, a load circuit, means including an electric valve for transmitting energy therebetween, means responsive to abnormal circuit conditions for reducing the conductivity of said valve sufficiently to limit the energy flow to a safe value and other means responsive to abnormal circuit conditions for maintaining said valve in a condition of reduced conductivity while said abnormal conditions obtain.

EARL R. EVANS.